(12) United States Patent
Hikichi et al.

(10) Patent No.: US 7,518,794 B2
(45) Date of Patent: Apr. 14, 2009

(54) TRANSMISSION TYPE DIFFRACTION GRATING

(75) Inventors: Naoko Hikichi, Tokyo (JP); Kenichi Nakama, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 12/018,043

(22) Filed: Jan. 22, 2008

(65) Prior Publication Data
US 2008/0186578 A1 Aug. 7, 2008

Related U.S. Application Data

(62) Division of application No. 11/188,030, filed on Jul. 22, 2005.

(30) Foreign Application Priority Data
Jul. 26, 2004 (JP) ............................. 2004-216886

(51) Int. Cl.
*G02B 5/18* (2006.01)

(52) U.S. Cl. ..................................... 359/569
(58) Field of Classification Search ................. 359/569
See application file for complete search history.

(56) References Cited

U.S. PATENT DOCUMENTS

| | | | | |
|---|---|---|---|---|
| 4,484,797 | A * | 11/1984 | Knop et al. | .................. 359/568 |
| 6,754,006 | B2 | 6/2004 | Barton et al. | |
| 7,019,904 | B2 | 3/2006 | Shiozaki et al. | |
| 7,085,054 | B2 | 8/2006 | Shiozaki et al. | |
| 2004/0136073 | A1 | 7/2004 | Shiozaki et al. | |
| 2006/0152809 | A1 | 7/2006 | Smith | |

* cited by examiner

*Primary Examiner*—Joshua L Pritchett
(74) *Attorney, Agent, or Firm*—Darby & Darby PC

(57) ABSTRACT

A transmission diffraction optical element is presented in which ridges having a roughly rectangular cross-section shape are disposed parallel to each other at a regular pitch at the surface of a substrate. Striped thin-film layers are formed on these ridges and a thin-film layer is inserted between the substrate and the ridges. The thin-film layers are arranged at a regular pitch identical to the regular pitch of the ridges and the thin-film layer does not have a periodic pattern oriented in the same direction as the periodic pattern of the ridges.

7 Claims, 11 Drawing Sheets

TRANSMISSION TYPE DIFFRACTION GRATING

CROSS-REFERENCE TO RELATED APPLICATIONS

The present application is a divisional of U.S. application Ser. No. 11/188,030, filed on Jul. 22, 2005, which claims priority under 35 U.S.C. §119 to Japanese Patent Application No. 2004-216886, filed on Jul. 26, 2004. Each of these applications is hereby incorporated herein by reference in its entirety.

BACKGROUND OF THE INVENTION

The present invention relates to a spectroscopic element used in optical machines that use multiple wavelengths. More specifically, the present invention relates to an optical diffraction element that uses a transmission grating.

Optical diffraction elements, of which diffraction gratings are a representative example, are widely used for optical spectrum analysis in spectrum analyzers. Spectrum analyzers need to have a high energy usage efficiency over a wide wavelength range. Reflective diffraction gratings are suited for providing high diffraction efficiency over a wide band range. Also, reflective diffraction gratings are widely used in spectrum analyzers since they provide superior properties with regard to the change in diffraction angle relative to wavelength, i.e., wavelength angle dispersion properties.

However, with reflective diffraction gratings in which the grating interval of the diffraction grating is approximately the wavelength, there can be significant changes in wavelength loss relative to the polarization state of the light. In these diffraction gratings, the wavelength loss properties are complex because they operate in the resonance region, preventing them from being stable across a wide wavelength range (e.g., see Non-Patent Document 1).

With transmission gratings, on the other hand, low polarization-dependent loss (PDL) and high diffraction efficiency can be achieved in a predetermined wavelength range. In transmission gratings having a periodic pattern of grooves, the diffraction efficiency is significantly influenced by the shape of the grooves and the material used to form the grooves. FIG. 1 shows an example of a laminar transmission grating 100 in which the grooves 112 have rectangular cross-section shapes perpendicular to the longitudinal direction of the grooves. It is known that a high diffraction efficiency can be obtained by making the groove depth h adequately deep relative to the groove pitch p. The ratio of the depth of the groove to the pitch of the grooves is referred to as the "aspect ratio" and it can be said that a diffraction grating with grooves having a high aspect ratio (h/p) has a high diffraction efficiency.

However, producing precise grooves with high aspect ratios is difficult in terms of processing technology, and is especially difficult when the groove pitch is small. When the groove shape and the optical properties of the diffraction grating are normalized by wavelength, it can be found that it would be preferable, in order to avoided processing difficulties, to use materials with high indices of refraction to produce transmission gratings with small aspect ratios. In other words, to obtain the equivalent optical properties, it is easier in terms of the production process to form shallow grooves with material with as high an index of refraction as possible rather than to reduce deep grooves with a material having a low index of refraction.

FIG. 2 shows an example of the diffraction efficiency and PDL as they relate to wavelength in a typical laminar diffraction grating. The substrate in FIG. 1 is formed from silica glass and the ridges are formed from $Ta_2O_5$, which is a material with a high index of refraction. The groove depth h is 1350 nm, the groove pitch p is 1111 nm, and the groove width is 555 nm. The figure shows that diffraction efficiency is roughly 70% in both TE mode and TM mode over a wide wavelength range of 1350-1750 nm, and the PDL is low, at −0.7-+0.5 dB.

In diffraction gratings, it is well known that when light having a wide wavelength range enters the diffraction grating, higher-order diffraction angles of the incident light having short wavelengths are superimposed with lower-order diffraction angle of the incident light having long wavelengths, preventing wavelengths from being separated. The wavelength range in which a diffraction grating can be used under conditions that do not result in the superimposition of diffracted light based on this phenomenon is referred to as the free spectral range of a diffraction grating. This range is determined by the following condition, where the shortest wavelength is $\lambda_1$, the longest wavelength is $\lambda_2$, and the order of diffraction is m.

$$\lambda_2 - \lambda_1 \geq \lambda_1/m \text{ (where } \lambda_1 < \lambda_2\text{)}$$

A diffraction grating can be used under conditions that do not generate the superimposition of diffracted light within the wavelength range defined by this condition.

[Non-Patent Document 1] Tadao Tsuruta, "Ouyou Kougaku 1", Baifukan, 1990.

Compared to reflective diffraction gratings, transmission gratings have lower PDL characteristics over a wide range, but as the example above shows, the absolute value of PDL tends to increase at a wavelength range with higher diffraction efficiency (1500-1600 nm). Thus, the wavelength range within which the diffraction efficiency is high and PDL is adequately low is not very wide.

Also, when using a diffraction grating in the infrared wavelength range, visible light may be used as a guide light. For example, a light with a wavelength $\lambda_1 = 633$ nm and $\lambda_2 = 1550$ nm, the condition described above would not be met even when m=1, thus making the light fall outside of the free spectral range. Thus, when these wavelengths are sent to the diffraction grating at the same time and a measurement is performed, there is noise resulting from the superimposition of the wavelengths. This problem may be avoided by using an optical filter to block incident light having unnecessary wavelengths or by using a different optical detector, but this results in a more complex optical system and more complex measuring procedure.

OBJECT AND SUMMARY OF THE INVENTION

The object of the present invention is to overcome these problems and to provide a transmission grating optical element with high diffraction efficiency and low PDL that provides added functions without requiring new parts to be added, and that compensates for deficiencies in transmission gratings.

In order to achieve the objects described above, the present invention provides the following transmission diffraction optical elements equipped with a diffraction grating wherein a plurality of parallel ridge-shaped projections with roughly rectangular cross-section shapes perpendicular to a longitudinal axis are formed in a periodic pattern on a substrate surface.

On a section of a surface of the diffraction grating parallel to the substrate surface and at a fixed distance from the substrate surface or on a plane parallel to the substrate surface with a boundary surface within the ridge-shaped projections, a plurality of parallel striped thin-film layers with a uniform composition is arranged at a pitch matching a pitch at which the ridge-shaped projections are arranged and with an orientation identical to an orientation of an arrangement of the ridge-shaped projections. A thin-film layer is disposed parallel to the substrate surface, having a boundary surface parallel to the surface either on the substrate surface or in the substrate, and formed with a uniform composition within a plane parallel to the substrate surface, the thin-film layer being formed without a periodic pattern in a direction identical to that of the periodic pattern of the ridge-shaped projections.

Various functions related to diffracted light can be added to the thin-film layer not having a periodic pattern in the direction of the periodic pattern of the ridge-shaped projections. For example, if the thin-film layer is an optical filter that eliminates light other than light with the wavelength to be used, incident light outside the free spectral range can be eliminated without the use of an external optical filter.

The striped thin-film layers arranged in the same direction as the periodic pattern of the ridge-shaped projections can reduce loss in the light entering the diffraction grating. Thus, by combining the two types of thin-film layers with a "laminar" diffraction grating, it is possible to provide a transmission diffraction optical element that is equipped with functions not available in conventional transmission diffraction gratings while providing high diffraction efficiency over a wide wavelength range as well as a low PDL.

It would be preferable for the striped thin-film layers to be disposed only on the top surfaces of the ridges. The tops of the ridges of the laminar diffraction grating are one of the incidence surfaces for light and are suited for thin-film layers that reduce reflection of incident light. The tops of the ridges form a striped plane so that providing a thin-film layer there results in a striped thin-film layer.

It would be preferable, when the ridge-shaped projections are formed from a material with an index of refraction $n_H$, and a groove depth for which desired characteristics for a transmission diffraction grating are achieved is h, for the following condition to be met:

$$n_H \times h = n_L \times h_L + n_H \times h_H$$

where $n_L$ is an index of refraction of the striped thin-film layers disposed on the top surfaces of the ridge-shaped projections, $h_L$ is a film thickness, and $h_H$ is a height of the ridge-shaped projections formed from the material with an index of refraction $n_H$.

In laminar diffraction gratings formed from a single material, optical characteristics can be obtained from a specific groove shape. If the groove depth that provides optical characteristics based on the index of refraction of the ridge material is given, the index of refraction and thickness of the thin-film layer can be selected so that, with the thin-film layer, there is optical equivalence with the groove depth. As a result, optical characteristics of the striped thin-film layer are added to the characteristics of the diffraction grating, thus providing a transmission diffraction optical element that has high diffraction efficiency over a wider wavelength range and that has a low PDL.

When the striped thin-film layers are formed as a multilayer structure with at least two layers formed from at least two types of materials, the $n_L$ is replaced with $n_{La}$ and the $h_L$ is replaced with $h_{Lt}$, where $n_{La}$ is an average index of refraction of the entire multilayer film and $h_{Lt}$ is a total film thickness.

The use of a multilayer film provides improvement in reflection reduction over the use of a single-layer film. In this case, by replacing the index of refraction and thickness of the single-layer film with the average index of refraction and total thickness of the multilayer film, it is possible to provide a transmission diffraction optical element with a high diffraction efficiency over a wide wavelength range as well as a low PDL.

Furthermore, it would be preferable for the striped thin-film layer to be disposed on top surfaces of the ridge-shaped projections and on bottom surfaces of grooves between the ridge-shaped projections. The bottom of the grooves of the laminar diffraction grating are also one of the incidence surfaces for light, and providing a thin film layer on the bottom surfaces of the grooves as well can further reduce reflection of incident light.

It would be preferable, when the ridge-shaped projections are formed from a material with an index of refraction $n_H$, and a groove depth for which desired characteristics for a transmission diffraction grating are achieved is h, for the following condition to be met:

$$n_H \times h = n_H \times h_H + n_{Lu} \times h_{Lu} - n_{Ld} \times h_{Ld}$$

where $n_{Lu}$ is an index of refraction of the striped thin-film layers disposed on the top surfaces of the ridge-shaped projections, $h_{Lu}$ is a film thickness thereof, $n_{Ld}$ is an index of refraction of the striped thin-film layers disposed on the bottom surfaces of the grooves between the ridge-shaped projections, $h_{Ld}$ is a film thickness thereof, and $h_H$ is a height of the ridge-shaped projections formed from the material with an index of refraction $n_H$.

In this case also, if the groove depth that provides optical characteristics based on the index of refraction of the ridge material is given, the index of refraction and thickness of the thin-film layer can be selected so that, with the thin-film layer, there is optical equivalence with the groove depth. As a result, optical characteristics of the striped thin-film layer are added to the characteristics of the diffraction grating, thus providing a transmission diffraction optical element that has high diffraction efficiency over an even wider wavelength range and that has a low PDL.

If at least one set of the striped thin-film layers is formed as a multilayer structure with at least two layers formed from at least two types of materials, the $n_L$ is replaced with $n_{La}$ and the $h_{Lu}$ replaced with $h_{Lt}$ or the $h_{Ld}$ is replaced with $h_{Lt}$, where $n_{La}$ is an average index of refraction of one set of the multilayer film and $h_{Lt}$ is a total film thickness.

As in the above case, by replacing the index of refraction and thickness of the single-layer film with the average index of refraction and total thickness of the multilayer film, it is possible to provide a transmission diffraction optical element with a high diffraction efficiency over a wide wavelength range as well as a low PDL.

Also, the thin-film layer without a periodic pattern in a direction identical to a direction of the periodic pattern of the ridge-shaped projections has wavelength-selective transmission properties.

For example, the thin-film layer can be formed as an optical filter that transmits the light to be used while reflecting or absorbing all other light. By providing a thin-film layer with this type of structure between the ridge-shaped projections and the substrate, incident light outside the free spectral range can be blocked, thus reducing noise during measurement. As a result, the need to provide a separate optical filter or to switch detectors is eliminated.

With the present invention, a thin-film layer that does not have a periodic pattern in the same direction as the periodic pattern of ridge-shaped projections makes it possible to provide various functions relating the diffracted light of a transmission diffraction grating without requiring new parts to be added. Also, striped thin-film layers arranged in the same direction as the periodic pattern of the ridge-shaped projections makes it possible to reduce loss when light enters the diffraction grating.

As a result, by combining these two types of thin-film layers with a "laminar" diffraction grating, it is possible to provide a transmission diffraction optical element that is equipped with functions not available in or that compensates for defects in conventional transmission diffraction gratings and provides higher diffraction efficiency over a wider wavelength range along with a low PDL.

The above, and other objects, features and advantages of the present invention will become apparent from the following description read in conjunction with the accompanying drawings, in which like reference numerals designate the same elements.

Figure 1:
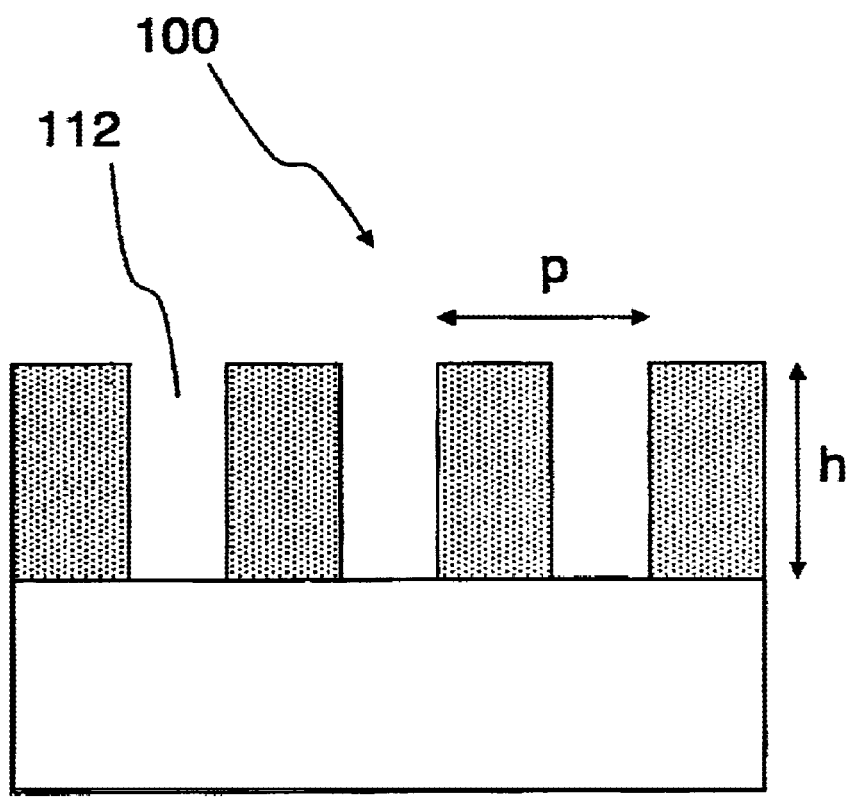
FIG. 1 is a simplified cross-section drawing of a conventional laminar diffraction grating.

LIST OF DESIGNATORS 10, 20: diffraction optical element
12: groove
14, 24, 64: ridge
32, 36: striped thin-film layer
34: thin-film layer
38: reflection-reducing film
50: substrate
100: transmission diffraction optical element

DETAILED DESCRIPTION OF THE PREFERRED EMBODIMENTS

Figure 3:
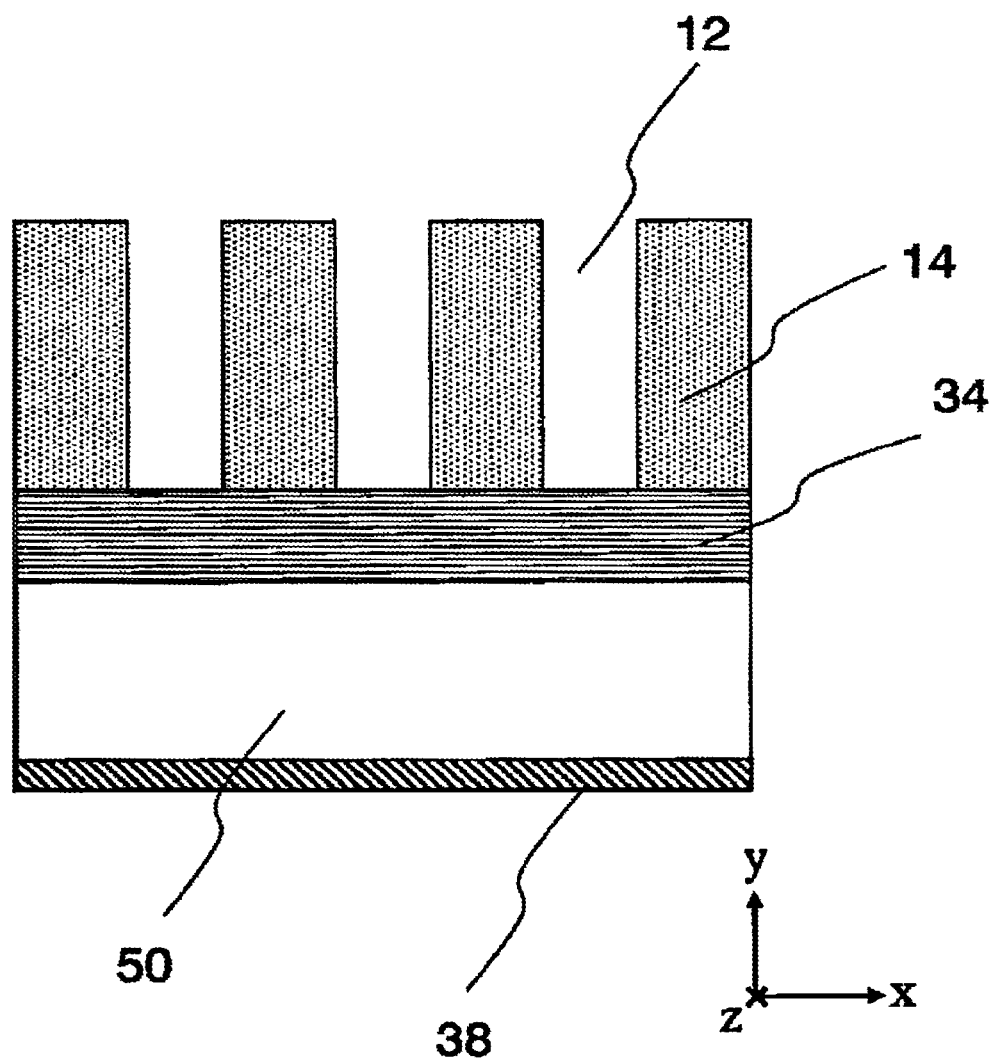
FIG. 3 is a simplified cross-section drawing of a laminar diffraction grating on which a thin-film layer is disposed.

As shown in FIG. 3, diffraction grating optical element of the present invention is essentially a laminar diffraction grating in which ridge-shaped projections (hereinafter referred to simply as ridges) 14 that have rectangular shapes along the x-y cross-section are arranged periodically along the x direction on a substrate 50. A thin-film layer 34 is disposed between the ridges 14 and the substrate 50. This thin-film layer 34 is formed uniformly on the substrate surface and is not formed with a periodic pattern at least along the direction in which the ridges 14 are arranged periodically (x direction). Various functions can be applied to the thin-film layer 34 based on the design of the film.

This thin-film layer can, for example, be formed with transmission properties that are selective based on wavelength so that light with wavelengths being used is transmitted while light with other wavelengths are reflected or absorbed, i.e., the thin-film layer can have optical filter functions. By interposing this type of optical filter between the ridges 14 and the substrate 50, stray light can be reduced. More specifically, stray light can be effectively reduced if the optical filter blocks light with short wavelengths that generate high-order diffraction light while long-wavelength light in the target wavelength range.

For example, if spectral measurement is to be performed in the infrared range, visible light would be used as a guide light for adjusting the optical path and the sampling position, and the high-order diffraction light of this guide light would become noise during measurement. In this case, noise could be reduced by using the thin-film layer 34 as an edge filter or a band-pass filter that transmits the signal wavelength range while reflecting the wavelength of the guide light. An example of this is described below.

In a transmission diffraction optical element having the structure shown in FIG. 3, the substrate 50 is formed from silica glass, and ridges 14 formed from $Ta_2O_5$ are formed thereupon. The thin-film layer 34 formed by layering $SiO_2$ and $Ta_2O_5$ is interposed between the substrate and the ridges. The thin-film layer 34 is formed by repeating 12 times the three-layer structure of $Ta_2O_5/SiO_2/Ta_2O_5$ (film thicknesses 38 nm/108 nm/38 nm). As in the conventional example from FIG. 1, the diffraction grating is shaped so that the groove depth h is 1350 nm, the groove pitch p is 1111 nm, and the groove width is 555 nm.

Figure 2:
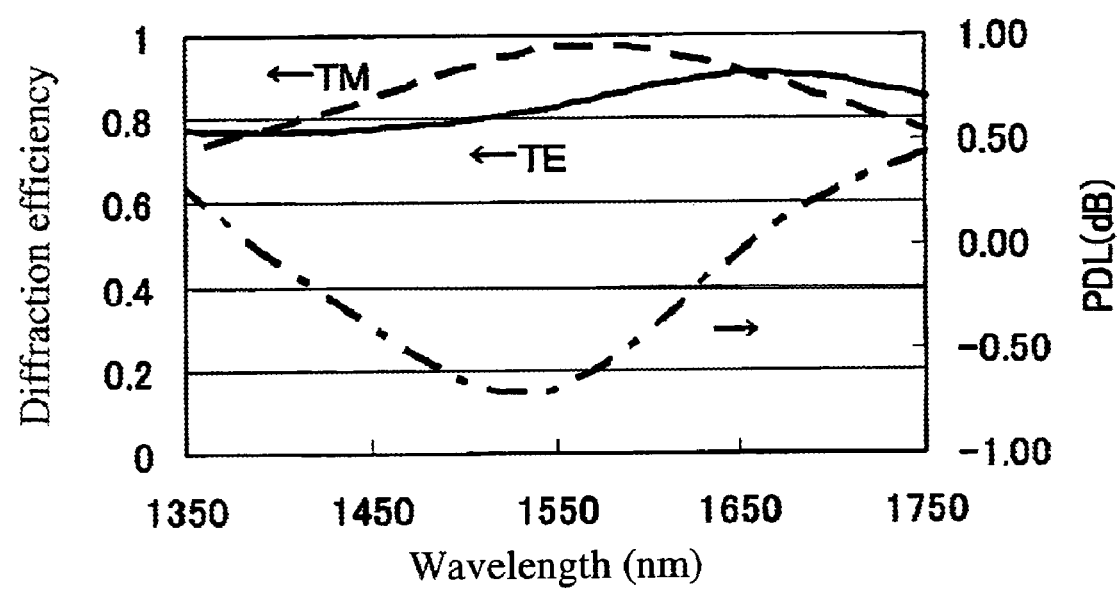
FIG. 2 illustrates the optical characteristics of a conventional laminar diffraction grating.
Figure 4:
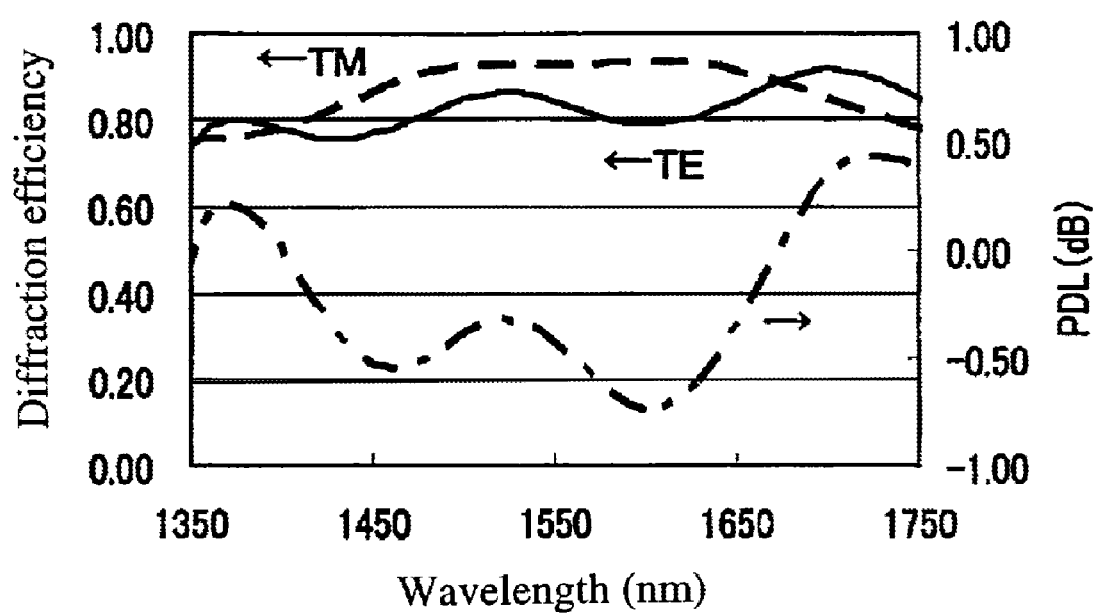
FIG. 4 illustrates the optical characteristics of a laminar diffraction grating on which a thin-film layer is disposed.

FIG. 4 shows the diffraction efficiency and PDL for this transmission diffraction optical element as related to wavelength over a wide wavelength range of 1350-1750 nm. It can be seen that compared to the characteristics shown in FIG. 2, the insertion of the thin-film layer 34 improves diffraction efficiency for TE mode and TM mode over a wide wavelength range. Also, no negative effect on PDL is seen.

Figure 5:
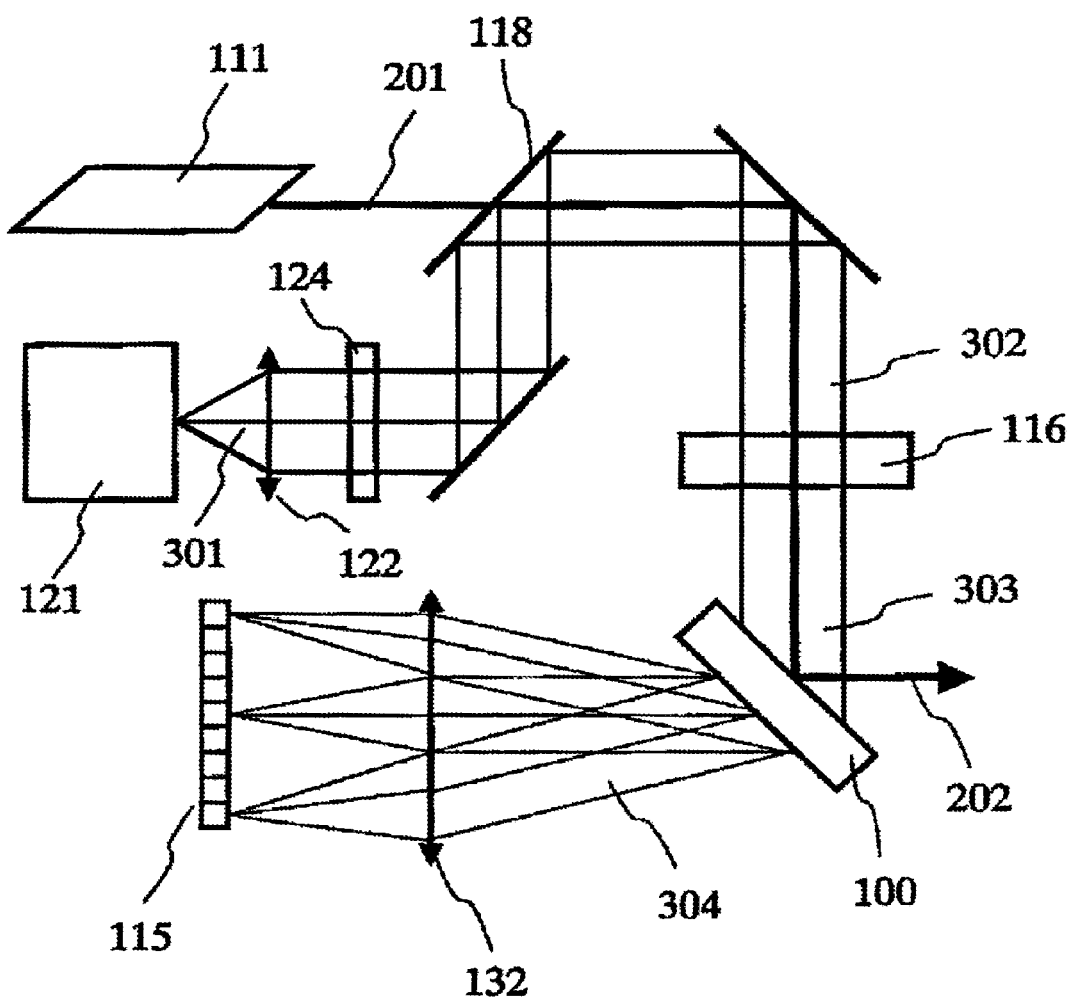
FIG. 5 is a figure showing a measurement system for measuring infrared light absorption using a transmission diffraction grating.

An example in which the diffraction optical element described above is used in a standard infrared absorption measuring system shown in FIG. 5 will be described. A xenon lamp 121 is used as the light source and a helium neon laser 111 having a wavelength of 633 nm is used as a guide light 201. A white light 301 emitted from the xenon lamp 121 passes through a lens 122 to form a parallel light, and an infrared transmission filter 124 removes visible light components. The infrared light 302 is applied to a test object 116, resulting in a detection light 303 having a spectrum that has been changed by the properties of the test object, and this is applied to the transmission diffraction optical element 100. The detection light 303 passes through the thin-film layer 34 and is diffracted by the diffraction grating. The diffracted light 304 is separated into wavelength components by angle, and is converged by a lens 132 onto an incidence surface of a light detection array 115.

The guide light 201 is combined with the infrared light 302 by a semi-transparent mirror 118 and is applied to the surface of the test object 116. The guide light that is passed through the test object 116 is reflected by the thin-film layer 34 of the transmission diffraction optical element 100 described above, and becomes a light 202 separated from the detection light 303.

The 0-degree transmission light generated by the diffraction optical element and the combined with the transmission diffraction light is measured as the amount of transmission light. If the transmission ratio of the proportion of the transmitted light relative to the incident light, the transmission ratio of light with a wavelength of 633 nm is 66% when there is no thin-film layer 34. For light with a wavelength of 1550 nm, the transmission ratio is 83% for TE-polarized light and 94% for TM-polarized light. When the thin-film layer 34 is present, the transmission ratio of light with a wavelength of 633 nm is no more than 2%, and the transmission ratio of light with a wavelength of 1550 nm is 83% for TE-polarized light and 94% for TM-polarized light.

In other words, the infrared light at 1550 nm maintains a high transmission rate whether or not the thin-film layer is present. However, by including the thin-film layer 34, the transmission ratio of the 633 nm light, which is a source of noise, is reduced to 1/30-th, and the need to provide a separate optical filter or the like is eliminated.

The above example describes a function that can be added by the insertion of a thin-film layer that has a structure with no periodicity in the direction in which the ridges are arranged. The added function does not necessarily need to be an optical function. For example, the thin-film layer can serve as a layer to stop etching when the grooves are to be formed by dry-etching.

In this type of transmission grating that uses a material with a high index of refraction, there is a tendency toward high reflectance loss at the diffraction grating surface, which can lead to reduced diffraction efficiency. One conventional means for improving diffraction efficiency of standard transmission gratings is to provide a film that is formed to reduce reflection (e.g., Japanese laid-open patent publication number Hei 10-177107, or Manabu Shiozaki and 1 other, "Genmitsu Ketsugouha Riron Wo Mochiita Tamakukaisekikoushi No Henpamuizonsekkei," Shingaku Gihou, Denshijouhou Tsuushin Gakkai, January 2004, PN2003-60, p. 47-50).

Figure 6:
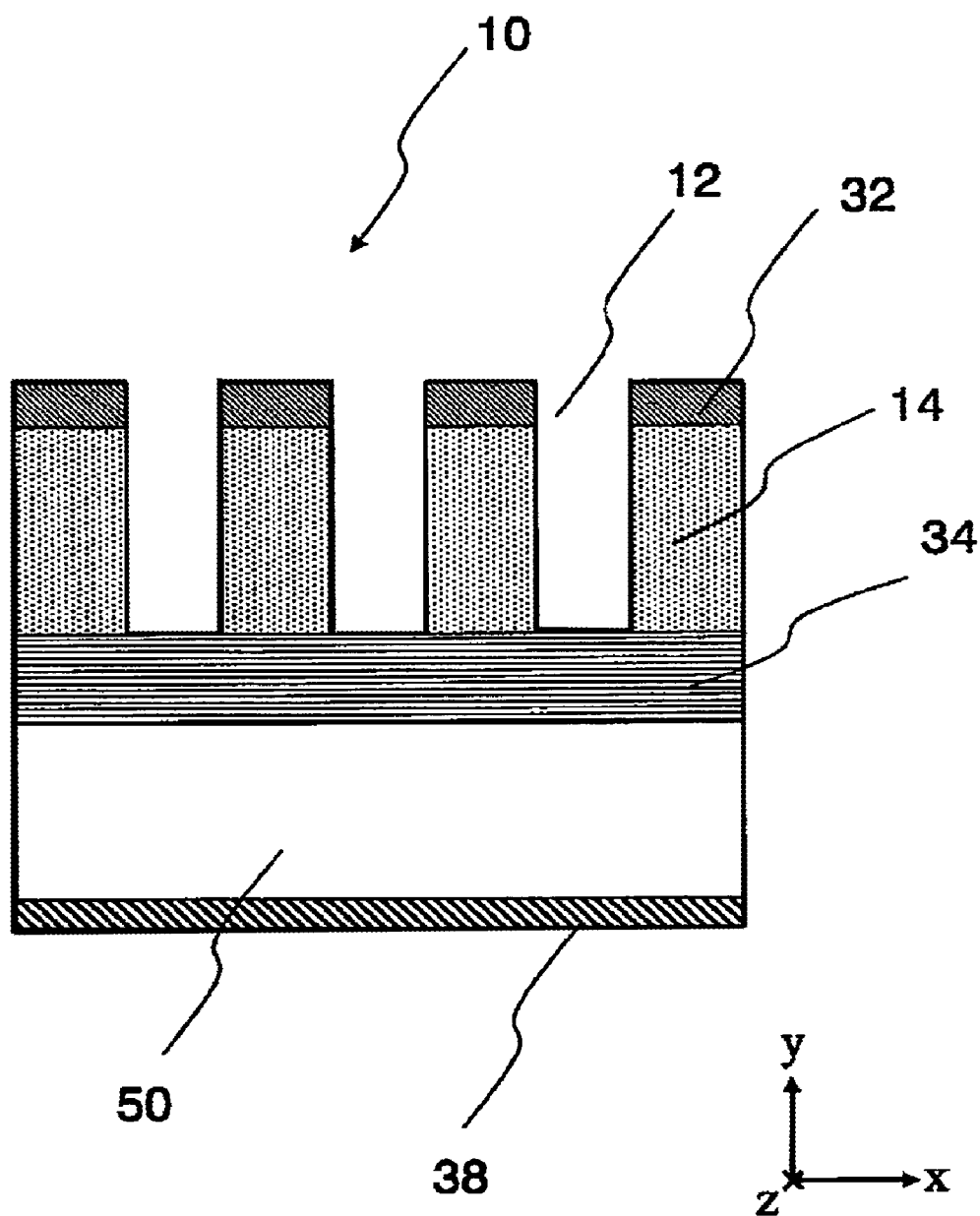
FIG. 6 is a simplified cross-section drawing showing a first working example of a transmission diffraction optical element according to the present invention.
Figure 7:
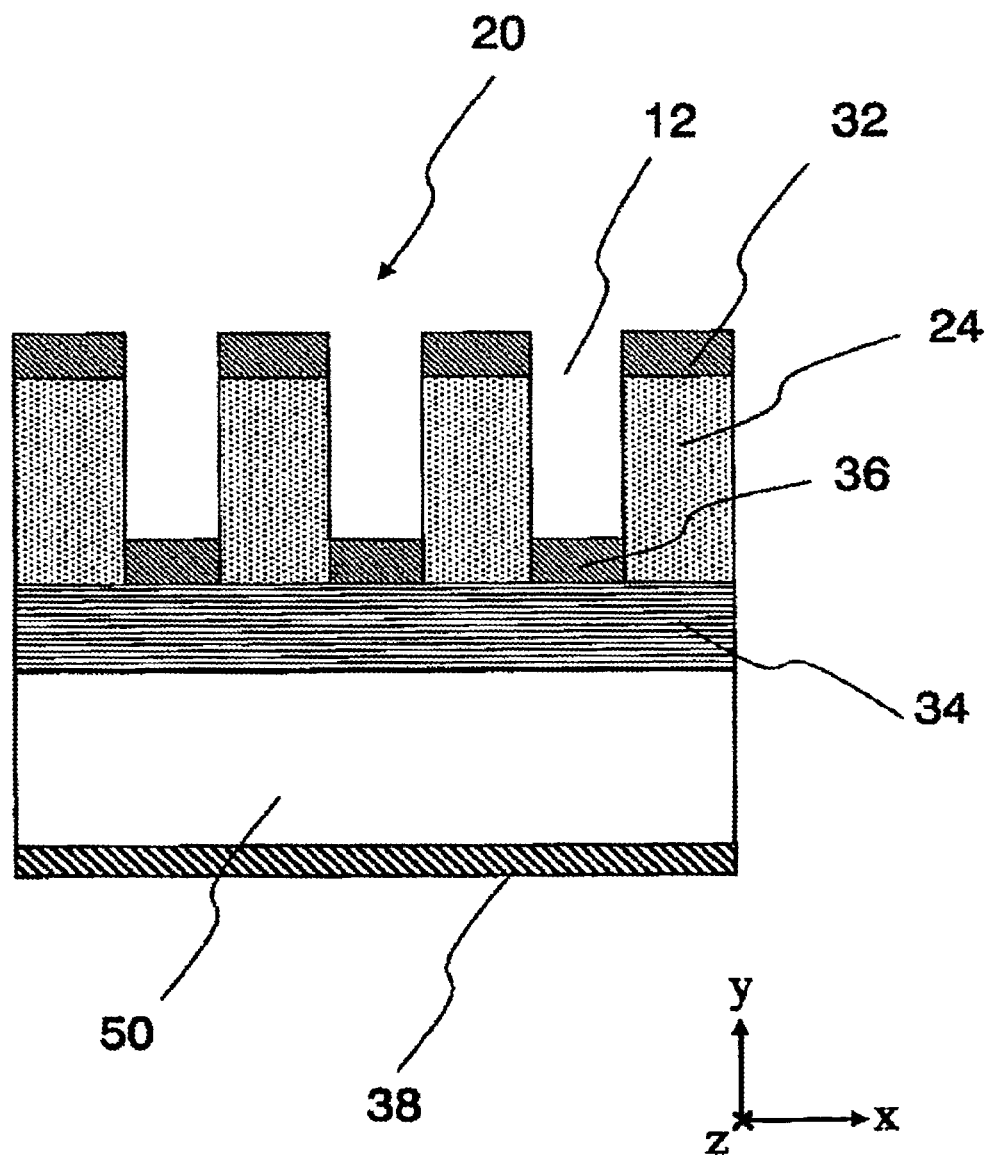
FIG. 7 is a simplified cross-section drawing showing a second working example of a transmission diffraction optical element according to the present invention.

As shown in FIG. 6, in the transmission diffraction optical element of the present invention, the thin-film layer 32 is disposed on the top surfaces of the ridges 14 of the laminar diffraction grating structure. Alternatively, it would also be possible to have films 36 disposed on the bottom surfaces of the grooves 12 between the ridges 14, as shown in FIG. 7. The thin-film layers 32 on the top surfaces of the ridges 14 and the thin-film layers 36 on the bottom surfaces of the grooves 12 are formed as roughly identically shaped stripes on the top surfaces of the ridges or the bottom surfaces of the grooves and are orientated in the same x direction as the periodic pattern of the ridges of the diffraction grating and at the same pitch, parallel to each other.

In both cases, it would be preferable to apply a reflection-reducing film 38 on the back surface of the substrate 50 in order to prevent the diffracted light from being reflected at the boundary surface between the substrate and air.

The striped thin-film layers 32, 36 disposed at a pitch identical to the pitch of the grooves of the diffraction grating serve to reduce loss when light enters the diffraction grating. Also, it can be said that the thin-film layer 34, which does not have a periodic pattern oriented in the same direction as the pitch of the grooves of the diffraction grating, serves to correct optical characteristics of the light after diffraction. By using this type of structure, a transmission diffraction optical element can be achieved that has a high diffraction efficiency and low polarization-dependent loss (PDL) over a wavelength range that is wider than that of conventional diffraction gratings.

In laminar diffraction gratings formed from a single material, the optimal optical characteristics can be achieved by using a specific groove shape. In the case of transmission gratings, the optical characteristics change depending on the number of grooves, the index of refraction of the material, the groove depth, the ridge width, and the like. A condition must be determined in which, when the thin-film layer is applied to the different sections, the apparent optical length ($n_H \times h$) of the overall height of the ridges (groove depth) does not change, where $n_H$ is the index of refraction of the material used to obtain the optimal optical characteristics and h is the groove depth for the optimal optical characteristics.

Figure 8:
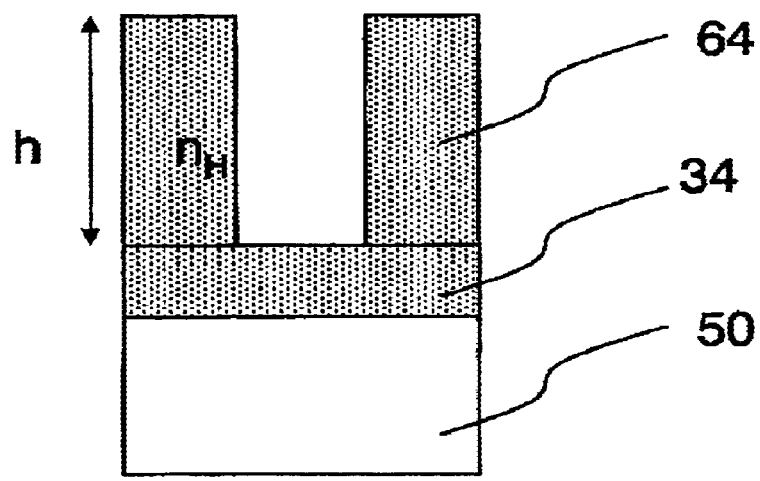
FIGS. 8(a) and 8(b) are drawings for the purpose of describing design concepts of a transmission diffraction optical element according to a first working example.
Figure 8:
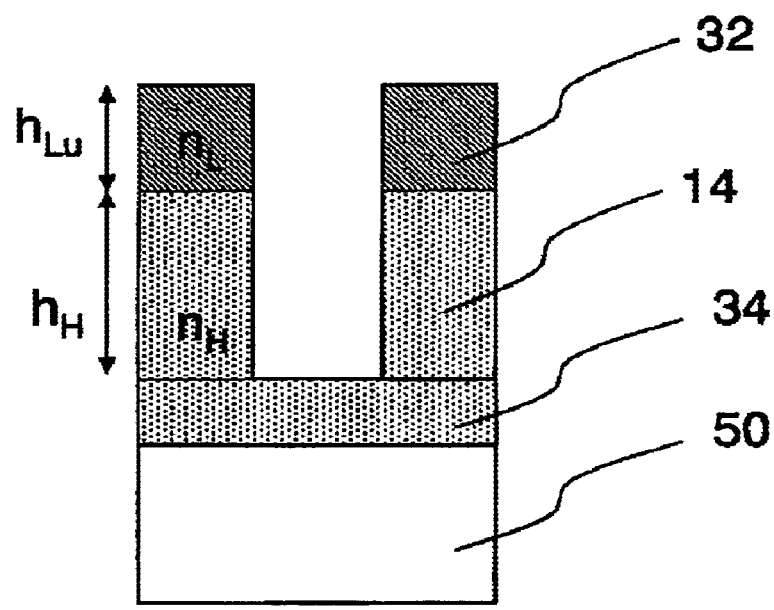

First, the case when the striped thin-film layers 32 are present only on the top surfaces of the ridges 14, as shown in FIG. 6, will be described. As shown in FIG. 8(a), the thin-film layer 34 is disposed between the ridges 14 of the diffraction grating and the substrate 50. When no thin-film layers are applied to the top surfaces of the ridges, $n_H$ is the index of refraction of a ridge 64, and h is the groove depth that provides the optimal optical characteristics. The following conditions should be met:

$$n_H \times h = n_H \times h_H + n_L \times h_L \quad (1)$$

where $h_H$ is the ridge height, $n_L$ is the index of refraction of the striped thin-film layers 32 disposed at a pitch that matches the pitch of the diffraction grating grooves, and $h_L$ is the film thickness.

Figure 9:
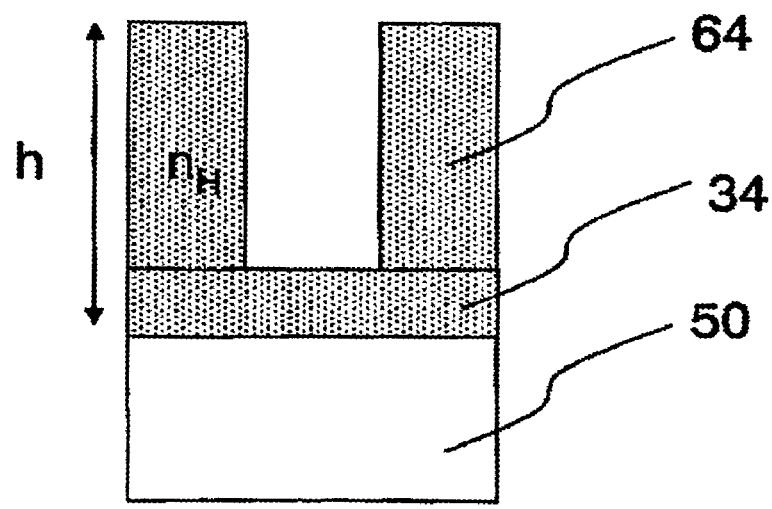
FIGS. 9(a) and 9(b) are drawings for the purpose of describing design concepts of a transmission diffraction optical element according to a second working example.
Figure 9:
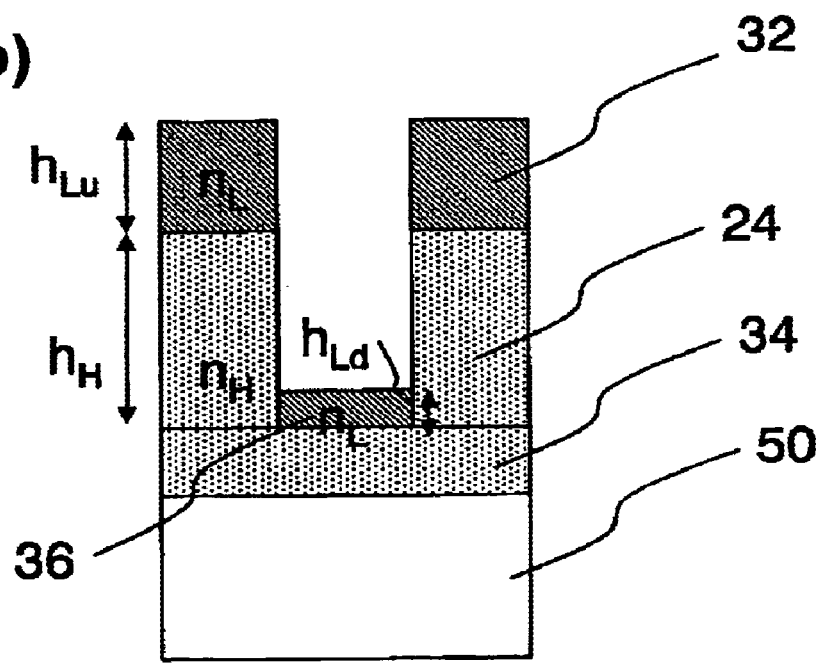

When striped thin-film layers 32, 36 are applied to both the top surfaces of the ridges and the bottom surfaces of the grooves (the structures shown in FIG. 7), the structure is as follows. As shown in FIG. 9(a), the thin-film layer 34 is disposed between the ridges 24 and the substrate 50, but if the striped thin-film layers are not present, the index of refraction of the ridges 24 is $n_H$ and the groove depth that provides the optimal optical characteristics is h. As shown in FIG. 9(b), the following condition should be met:

$$n_H \times h = n_H \times h_H + n_{Lu} \times h_{Lu} - n_{Ld} \times h_{Ld} \quad (2)$$

where $h_H$ is the height of the ridges 24 formed from a material with an index of refraction $n_H$, $n_{Lu}$ is the index of refraction of the striped thin-film layers 32 on the top surfaces of the ridges 24, $h_{Lu}$ is the film thickness, $n_{Ld}$ is the index of refraction of the striped thin-film layers 36 on the bottom surfaces of the grooves, and $h_{Ld}$ is the film thickness thereof.

The striped thin-film layers 32, 36 can be films with multiple layers. If multilayer films are used, the condition (1) or the condition (2) should be met, where $n_L$ and $h_L$ are as follows:

$$n_L = (n1 \times h_L 1 + n2 \times h_L 2 + n3 \times h_L 3 + \ldots + n_N \times h_N)/H_L$$

$$h_L = h_L 1 + h_L 2 + h_L 3 + \ldots + h_N$$

where the indices of refraction of the materials in the multilayer film are n1, n2, n3, ..., $n_N$, and the film thicknesses thereof are $h_L 1$, $h_L 2$, $h_L 3$, ..., $h_N$.

As described above, layers are provided and the height of the ridges and the striped thin-film layers disposed at a pitch matching the pitch of the groove of the diffraction grating are set up so that the optical length is the same as that for the ridge height (groove depth) that provides optimal characteristics in the context of the basic diffraction grating structure by itself. As a result, the optical characteristics of the basic structure of the diffraction grating by itself can be maintained while the optical characteristics from striped thin-film layers can be added.

For example, if the striped thin-film layers disposed at a pitch matching that of the grooves of the diffraction grating have reflection-reducing properties in the target wavelength range, the reflection loss can be reduced when light enters into the diffraction grating, thus providing optical characteristics that improve upon the diffraction efficiency of the basic diffraction grating structure by itself.

If the striped thin-film layer is to serve as a reflection-reducing film, the film is set up to maximize light transmission for the target wavelength range. If reflection-reducing films having different film thicknesses are disposed on the top surfaces of the ridges and the bottom surfaces of the grooves, it would be more preferable for the top surfaces of the ridges to reduce reflection for the ridge material, and for the bottom surfaces of the grooves to reduce the reflection for the groove bottom material, but it would be preferable for at least the top surfaces of the ridges to have reflection-reducing properties for the ridge materials. The reflection-reducing film can be a single-layer film or a multilayer film.

If a single-layer film is used, the material has an index of refraction lower than that of the ridge material, and the film thickness should generally meet the condition $\lambda/4n_L$, where $\lambda$ is the target wavelength and $n_L$ is the index of refraction of the reflection-reducing film. However, depending on the angle of incidence, the characteristics of the reflection-reducing film section can be polarization-dependent. By offsetting the film thickness of the reflection-reducing film by an appropriate amount from $\lambda/4n_L$ so that the polarization-dependent characteristics of the reflection-reducing film and the polarization-dependent characteristics of the diffraction grating cancel each other out, a transmission diffraction grating can be provided that not only has a high diffraction efficiency but also low polarization dependence.

Also, ripples in the wavelength characteristics of the transmittance caused by the thin-film layer can be used to correct the wavelength characteristics of diffraction efficiency, thereby reducing PDL while also improving the transmittance in the target wavelength range so that the maximum diffraction efficiency can be increased.

In this example, the striped thin-film layer is described as being on the surface of the diffraction grating, but it would also be possible for it to be within the ridges. Similarly, the thin-film layer that does not have periodicity in the direction of the pitch of the ridges can be disposed between the substrate and the ridges and also within the substrate.

Two working embodiments of a transmission diffraction grating according to the present invention will be described. First, the methods for making these will be described.

(First Production Method)

First, as shown in FIG. 6, there will be described a method for making a transmission diffraction grating 10 according to the present invention, including striped thin-film layers 32 disposed at a pitch matching that of the ridges and formed only on the top surfaces of the ridges 14. First, sputtering or vapor deposition is used to form on the glass substrate a thin film structure that does not have a periodic pattern in the same direction as the arrangement of the ridges (x direction) of the diffraction grating. Next, sputtering or vapor deposition with the material used to form the ridges 14 is performed until a predetermined design thickness for the film is achieved. Furthermore, sputtering or vapor deposition is used on the top surfaces of the ridges of the diffraction grating to form thin-film layers having a predetermined film thickness. Then, sputtering is used to form a Cr film that serves as a mask for producing the grooves, and photolithography and etching are used to form a mask pattern that has a predetermined pitch and groove width. With this mask, an inductive coupled plasma-reactive ion etching (ICP-RIE) is used to perform dry etching of the film that will form the ridge sections so that a groove depth according to the predetermined design is achieved. The Cr film is then removed, resulting in the transmission diffraction grating 10.

(Second Production Method)

Next, a method for producing a transmission diffraction grating according to the present invention including thin-film layers 32, 36 on the top surfaces of the ridges and the bottom surfaces of the grooves as shown in FIG. 7 will be described. First, sputtering or vapor deposition is performed to form on the glass substrate a thin-film layer that does not have a periodic pattern in the same direction as the direction of the periodic pattern (x direction) of the ridges. Sputtering or vapor deposition is performed on top of this using the material that will form the ridge sections of the diffraction grating so that a predetermined design film thickness is achieved. Then, a Cr film that will serve as a mask for performing the grooves is formed by sputtering, and a mask pattern is formed by photolithography and etching so that the predetermined pitch and groove widths are formed. Using this mask and ICP-RIE, vapor-phase etching is performed to achieve a groove depth based on the predetermined design. Finally, the Cr film is removed and sputtering or vapor deposition is used to form a thin-film layer having a pitch that matches the pitch of the ridges on the diffraction grating. This film-forming operation results in the formation of thin-film layers 32, 36 on the top surfaces of the ridges and the bottom surfaces of the grooves.

FIRST WORKING EXAMPLE

A first working example of the present invention will be described. A diffraction optical element according to this working example has the basic structure shown in FIG. 6. A transmission diffraction grating with ridges formed from $Ta_2O_5$ is disposed on a silica glass substrate, and a multilayer film formed from $SiO_2$ and $Ta_2O_5$ layers is inserted between the substrate and the ridges to serve as a thin-film layer. Furthermore, an $SiO_2$ film is formed on the top surfaces of the ridges. The multilayer film described above is formed by repeating twelve times an $Ta_2O_5/SiO_2/Ta_2O_5$ (film thickness: 38 nm/108 nm/38 nm) three-layer structure.

The diffraction optical element of this working example is produced according to the first production method described above. The multilayer film described above is formed on the silica glass, and a $Ta_2O_5$ film that will form the ridges of the diffraction grating is formed on this multilayer film. An $SiO_2$ film is formed on top of that. Then, on top of this, a Cr film pattern mask of grooves formed at approximately 900 grooves/mm with a groove width of 555 nm is produced. Using this mask, vapor-phase etching is performed up to a depth immediately above the multilayer film structure, resulting in a diffraction optical element with striped $SiO_2$ film layers disposed on the top surfaces of the ridges. Also, a reflection-reducing film is applied to the back surface of the silica glass substrate in order to prevent reflection of diffracted light at the boundary surface between the substrate and air.

When producing $Ta_2O_5$ with an index of refraction of 2.1, the optimal groove depth h is 1350 nm. When forming the $SiO_2$ on the tops of the ridges, if the thickness of the $SiO_2$ film is defined to meet condition (1), $h_H$ and $h_L$ in the condition (1) will be as follows:

First working example: $h_H$=1140 nm, $h_L$=306 nm (groove depth: 1446 nm)

For the purpose of comparison, a first comparative example with the following combination that does not meet the condition (1) was prepared.

First comparative example: $h_H$=1350 nm, $h_L$=306 nm (groove depth: 1656 nm)

Figure 10:
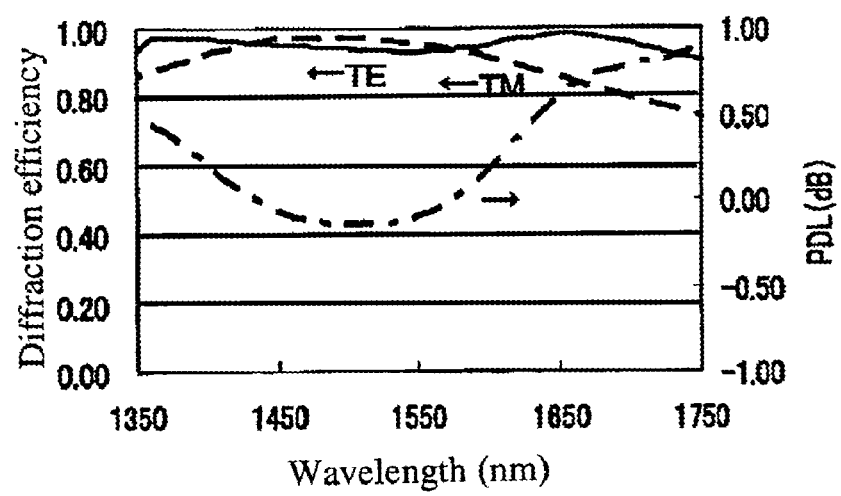
FIGS. 10(a) and 10(b) illustrate the optical characteristics of a transmission diffraction optical element according to a first working example.
Figure 10:
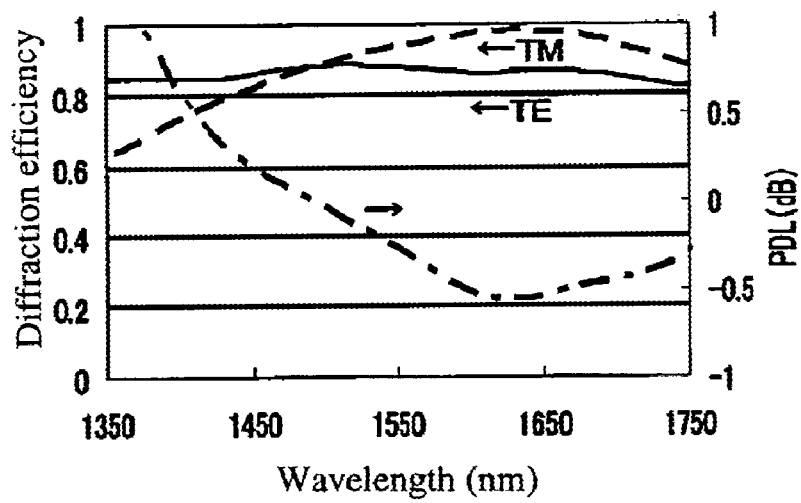

For these diffraction gratings, diffraction efficiency was measured when light with a wavelength range of 1350 nm-1750 nm entered the diffraction grating surface at an angle of incidence of 45 deg. The results of the measurement are shown in FIG. 10. FIG. 10(a) shows the results for the first working example, and FIG. 10(b) shows the results for the first comparative example. When the two are compared, the first working example has a lower PDL at a wider range. For example, the wavelength range in which the PDL is −0.5-0.5 dB, is 1350-1630 nm for the first working example, while the range is 1410-1590 nm for the first comparative example. The first working example has a broader low-PDL region especially toward the shorter wavelengths. Also, the wavelength range within which the diffraction efficiency is at least 85% for both TE mode and TM mode is, for the first working example, 1350-1660 nm and 1470-1760 nm for the first comparative example, showing that diffraction efficiency is higher on the shorter wavelengths for the first working example here as well. Of course, if visible light is applied to the diffraction optical element at the same time, it is reflected by the multilayer film and does not combine with the transmitted diffracted light.

SECOND WORKING EXAMPLE

The second working example of the present invention has the basic structure shown in FIG. 7. A transmission diffraction grating is formed on a silica glass substrate with ridges formed from $Ta_2O_5$ as in the first working example, and a multilayer film formed from $SiO_2$ and $Ta_2O_5$ layers is inserted between the substrate and the ridges. Furthermore, $SiO_2$ film is formed at the top surfaces of the ridges and the bottom surfaces of the grooves. As in the first working example, the multilayer film is formed by repeating twelve times the $Ta_2O_5/SiO_2/Ta_2O_5$ (film thickness: 38 nm/108 nm/38 nm) three-layer structure.

The diffraction optical element of this working example is formed according to the second production method described above. The multilayer film described above is formed on the silica glass substrate, and a $Ta_2O_5$ film that will form the ridges of the diffraction grating is formed on the multilayer film. Then, a Cr film pattern mask is prepared to form a mask with a groove count of approximately 900 grooves/mm and a groove width of 555 nm. Using this mask, vapor-phase etching is performed up to a depth directly above the multilayer film structure to form the ridges. Then, the Cr mask is removed and an $SiO_2$ film is formed, thus forming an $SiO_2$ film layer on the top surfaces of the ridges and the bottom surfaces of the grooves at the same time. Also, a reflection-reducing film is formed on the back surface of the silica glass substrate to prevent reflection of diffracted light at the boundary surface between the substrate and air.

If the ridges are formed from $Ta_2O_5$ with an index of refraction of 2.1, the optimal groove depth h is 1350 nm. When forming an $SiO_2$ film on top of the ridges and the grooves for these ridges, if the thicknesses of the $SiO_2$ films are defined to meet the condition (2), $h_H$ and $h_{Lu}$ and $h_{Ld}$ of the condition (2) are as follows.

Second working example: $h_H$=1350 nm, $h_{Lu}$=$h_{Ld}$=306 nm (Groove depth: 1656 nm)

For the purpose of comparison, a combination that does not meet the condition (2) was prepared as a second comparative example.

Second comparative example: $h_H$=1044 nm, $h_{Lu}$=$h_{Ld}$=306 nm (Groove depth: 1350 nm)

Figure 11:
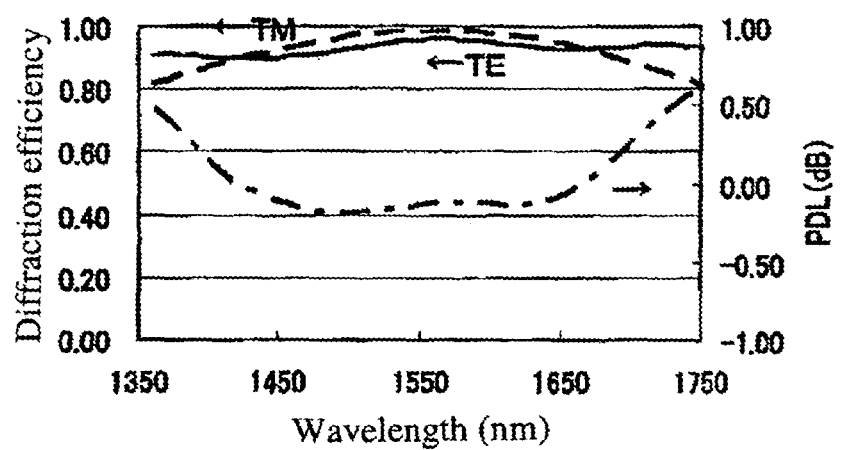
FIGS. 11(a) and 11(b) illustrate the optical characteristics of a transmission diffraction optical element according to a second working example.
Figure 11:
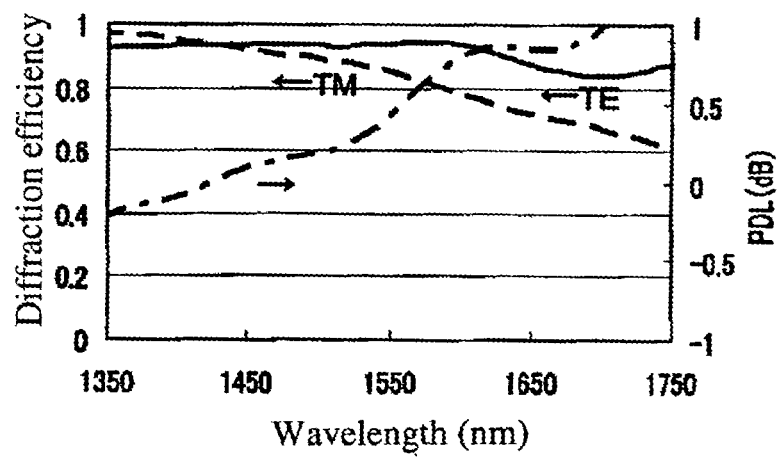

The diffraction efficiencies for these diffraction gratings were measured when light with wave-length range of 1350 nm-1750 nm entered the diffraction grating surface at an angle of incidence of 45 deg. The results of the measurement are shown in FIG. 11. FIG. 11(a) shows the results from the second working example, and FIG. 11(b) shows the results from the second comparative example. Comparing the two, the second comparative example has a low PDL over a wider range. For example, the wavelength range over which PDL is in the range −0.5-0.5 dB is 1360-1730 nm for the second working example and 1430-1550 nm for the second comparative example, with the first working example having a broader low-PDL range for longer wavelengths. Also, the wavelengths for which diffraction efficiency is at least 85% for both TE mode and TM mode is 1360-1760 nm for the second working example and 1320-1760 nm for the second comparative example. Here also, diffraction efficiency is higher for the second working example toward the longer wavelengths. Of course, if visible light enters the diffraction optical element at the same time, it is reflected by the multilayer film and is prevented from combining with the transmitted diffraction light.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A transmission diffraction optical element comprising:
    a substrate layer;
    a plurality of parallel ridge-shaped projections formed in a periodic pattern and disposed on the substrate layer, said ridge-shaped projections having roughly rectangular cross-section shapes perpendicular to a longitudinal axis;
    a plurality of parallel striped thin-film layers with a uniform composition being arranged at a pitch matching a pitch at which said ridge-shaped projections are arranged and with an orientation identical to an orientation of an arrangement of said ridge-shaped projections, said plurality of parallel striped thin-film layers formed parallel to said substrate layer and at a fixed distance from said substrate layer or on a plane parallel to said substrate layer with a boundary surface within said ridge-shaped projections; and
    a thin-film layer being disposed parallel to said substrate layer, having a boundary surface either parallel to the surface of said substrate layer or on said substrate layer, and formed with a uniform composition within a plane parallel to said substrate layer, said thin-film layer being formed without a periodic pattern in a direction identical to that of said periodic pattern of said ridge-shaped projections and having wavelength-selective transmission properties;

wherein said striped thin-film layers are disposed on top surfaces of said ridge-shaped projections and on bottom surfaces of grooves between said ridge-shaped projections.

2. A transmission diffraction optical element according to claim 1, wherein, when said ridge-shaped projections are formed from a material with an index of refraction $n_H$, and a groove depth for which desired characteristics for a transmission diffraction grating are achieved is h, a following condition is met:

$$n_H \times h = n_H \times h_H + n_{Lu} \times h_{Lu} - n_{Ld} \times h_{Ld}$$

where $n_{Lu}$ is an index of refraction of said striped thin-film layers disposed on said top surfaces of said ridge-shaped projections, $h_{Lu}$ is a film thickness thereof, $n_{Ld}$ is an index of refraction of said striped thin-film layers disposed on said bottom surfaces of the grooves between said ridge-shaped projections, $h_{Ld}$ is a film thickness thereof, and $h_H$ is a height of said ridge-shaped projections formed from said material with an index of refraction $n_H$.

3. A transmission diffraction optical element according to claim 2, wherein:
at least one set of said striped thin-film layers is formed as a multilayer structure with at least two layers formed from at least two types of materials; and
said $n_L$ is replaced with $n_{La}$ and said $h_{Lu}$ is replaced with $h_{Lt}$ or said $h_{Ld}$ is replaced with $h_{Lt}$, where $n_{La}$ is an average index of refraction of one set of said multilayer film and $h_{Lt}$ is a total film thickness.

4. A transmission diffraction optical element according to claim 1, wherein:
one of the plurality of striped thin-film layers is disposed on each bottom groove surface between adjacent ridge-shaped projections.

5. A transmission diffraction optical element according to claim 1, wherein:
a first one of the plurality of striped thin-film layers is disposed on the top surface of each ridge-shaped projection and a second one of the plurality of striped thin-film layers is disposed on each bottom groove surface between adjacent ridge-shaped projections.

6. A transmission diffraction optical element according to claim 5, wherein, when said ridge-shaped projections are formed from a material with an index of refraction $n_H$, and a groove depth for which desired characteristics for a transmission diffraction grating are achieved is h, a following condition is met:

$$n_H \times h = n_H \times h_H + n_{Lu} \times h_{Lu} - n_{Ld} \times h_{Ld}$$

where $n_{Lu}$ is an index of refraction of said first striped thin-film layer, $h_{Ld}$ is a film thickness thereof, $n_{Ld}$ is an index of refraction of said second striped thin-film layer, $h_{Ld}$ is a film thickness thereof and $h_H$ is a height of said ridge-shaped projections formed from said material with an index of refraction $n_H$.

7. A transmission diffraction optical element according to claim 6,
wherein at least said first or second striped thin-film layer is formed as a multilayer structure with at least two layers formed from at least two types of materials; and
said $n_L$ is replaced with $n_{La}$ and said $h_{Lu}$ is replaced with $h_{Lt}$ or said $h_{Ld}$ is replaced with $h_{Lt}$, where $n_{La}$ is an average index of refraction of one set of said multilayer film and $h_{Lt}$ is a total film thickness.

* * * * *